(12) United States Patent
Harimoto et al.

(10) Patent No.: US 6,460,498 B2
(45) Date of Patent: Oct. 8, 2002

(54) ROCKER ARM

(75) Inventors: Kazuyoshi Harimoto; Yoshiyasu Nakano; Nobuhiro Kasahara, all of Shizuoka (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 09/842,190

(22) Filed: Apr. 26, 2001

(65) Prior Publication Data
US 2002/0000214 A1 Jan. 3, 2002

(30) Foreign Application Priority Data
Apr. 28, 2000 (JP) .......................................... 2000-129521

(51) Int. Cl.⁷ ................................................. F01L 1/18
(52) U.S. Cl. ............................... 123/90.41; 123/90.39; 123/90.42; 123/90.44; 384/548; 384/565
(58) Field of Search ............................ 123/90.15, 90.39, 123/90.4, 90.41, 90.42, 90.43, 90.44, 90.45, 90.46, 90.47; 29/888.2; 74/519, 559; 384/548, 569, 565

(56) References Cited

U.S. PATENT DOCUMENTS

| 3,680,934 A | * | 8/1972 | Laussermair | 308/212 |
| 4,508,396 A | * | 4/1985 | Doi | 384/463 |
| 5,332,317 A | * | 7/1994 | Niwa | 384/548 |
| 5,456,538 A | * | 10/1995 | Honda | 384/569 |
| 5,642,693 A | * | 7/1997 | Kotani | 123/90.41 |
| 5,816,207 A | * | 10/1998 | Kadowaka | 123/90.42 |

FOREIGN PATENT DOCUMENTS

| JP | 8-093418 | 4/1996 |
| JP | 08-109959 | 4/1996 |
| JP | 10-047334 | 2/1998 |

* cited by examiner

Primary Examiner—Thomas Denion
Assistant Examiner—Jaime Corrigan
(74) Attorney, Agent, or Firm—Wenderoth, Lind & Ponack, L.L.P.

(57) ABSTRACT

It is aimed to prolong the life of a rocker arm in which rollers are housed in a full type form between a ring and a pin from a viewpoint completely different from the idea of improving the material. It is proposed to suitably control the relation between clearances in circumferential and radial directions for the rollers housed in a roller housing space formed between the outer peripheral surface of the pin and the inner peripheral surface of the ring.

16 Claims, 3 Drawing Sheets

ROCKER ARM

BACKGROUND OF THE INVENTION

This invention relates to a rocker arm pivotally mounted between a cam and a valve in a valve-moving mechanism for driving intake and exhaust valves in an internal combustion engine, and particularly a rocker arm having a roller at its portion abutting the cam.

This type of rocker arm generally has its roller rotatably supported on one end of the rocker arm body by a pin, and between the outer peripheral surface of the pin and the inner peripheral surface of the ring, a roller housing space is formed to house a plurality of rollers in a full type form.

Since the ring portion of this rocker arm is used under severe lubricating conditions, in order to improve durability and wear resistance of the rocker arm, as described in Japanese patent publications 10-47334, 8-93418 and 8-109959, improvements in the roller material have been mainly pursued, such as modification of steel material and use of a ceramic material.

An object of this invention is to prolong the life of a rocker arm in which a plurality of rollers are housed in a full type form between the ring and the pin from a viewpoint completely different from the idea of improving the material.

SUMMARY OF THE INVENTION

The inventors of this invention have found out that as a factor having an influence on the life of a rocker arm in which a plurality of rollers are housed between a ring and a pin in a full type form, clearances in the circumferential and radial directions provided between the outer peripheral surface of the pin and the inner peripheral surface of the ring play an important role, and they analyzed the relation between these clearances and the life.

In this invention, the clearance in the radial direction refers to a difference between the inscribed circle of the rollers and the outer periphery of the pin with the rollers in contact with the inner peripheral surface of the ring. The load rate of the rollers depends on the size of the clearance in the radial direction.

As the clearance in the radial direction increases, the load rate decreases, so that the surface pressure per roller increases. On the other hand, as the clearance decreases, the load rate increases, so that even though the surface pressure per roller decreases, due to the influence of the shape of the inner peripheral surface of the ring (roundness and cylindricity), the clearance can partially become negative. This can cause seizure.

In particular, since the ring has a thick wall thickness compared with an outer ring such as shells and has high rigidly, under severe lubricating conditions, it is necessary to avoid premature seizure due to clearances being too small. Also, difficulty in assembly results from clearances being too small.

Also in this invention, the clearance in the circumferential direction refers to a clearance per roller which is determined by dividing by the total number of the rollers the clearance formed between the first and last rollers when all the rollers have been displaced together into contact with one another and with the rollers abutting the inner peripheral surface of the ring.

As this clearance in the circumferential direction increases, skew of the rollers increases, so that an excessive load due to an edge load is produced. This shortens the life. On the other hand, as the clearance in the circumferential direction decreases, there occurs a problem of wear due to a struggle between the rollers and heat buildup due to slip.

The clearances in the radial and circumferential directions were heretofore set experimentally at 0.009–0.22 mm in the radial direction and 0.003–0.011 mm in the circumferential direction, respectively, in view of ease of assembly of the rollers. But according to this invention, the clearance in the radial direction has been changed from the conventional 0.009–0.022 mm to 0.005–0.018 mm to extend the life in view of the relation between the clearance in the circumferential direction in this range and the life. It was found out that it is possible to extend the life by setting the clearance in the circumferential direction at 0.012–0.018 mm, which is larger than the conventional range of 0.003–0.011 mm.

Other features and objects of the present invention will become apparent from the following description made with reference to the accompanying drawings, in which:

DETAILED DESCRIPTION OF THE PREFERRED EMBODIMENT

Figure 1:
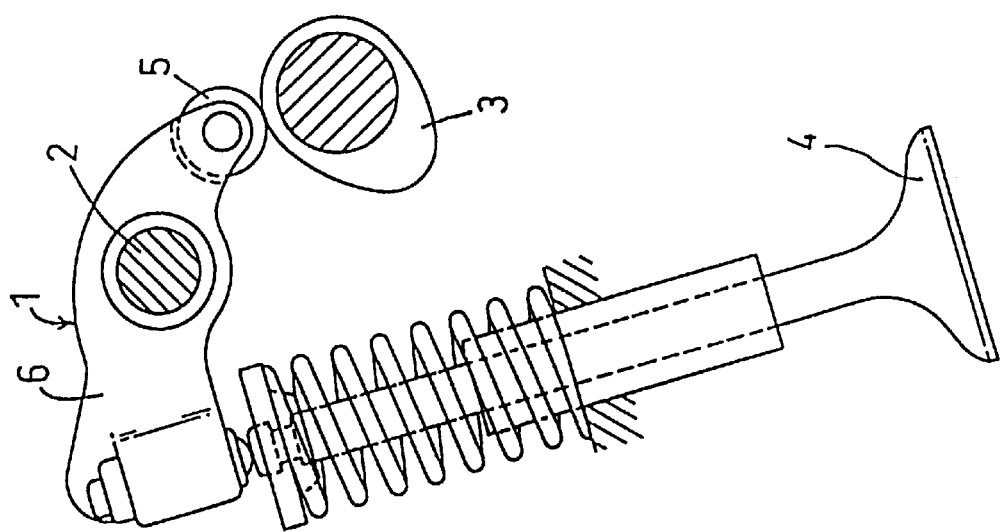
FIG. 1 is an entire view of a rocker arm according to this invention.

Referring to FIG. 1, the rocker arm 1 according to this invention is supported on an engine block by a shaft 2 and pivotally mounted between a cam 3 and a valve 4 with one end thereof abutting the cam 3, which rotates in synchronization with the engine, and the other end acting on the valve 4. The portion abutting the cam 3 comprises a ring 5.

Figure 2:
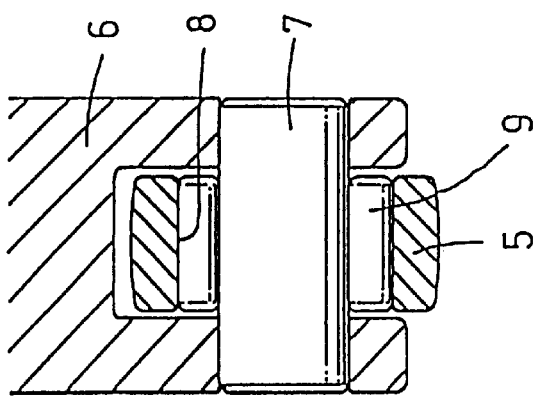
FIG. 2 is a cross-sectional view of the ring portion of the rocker arm.
Figure 3:
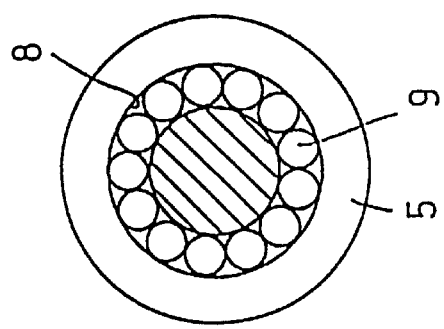
FIG. 3 is a vertical sectional view of the ring portion of the rocker arm.

As shown in FIGS. 2 and 3, the ring 5 is housed in a bifurcated portion formed at one end of a rocker arm body 6, and rotatably supported on the bifurcated portion by a pin 7. Between the outer surface of the pin 7 and the inner peripheral surface of the ring 5, a roller housing space 8 is formed in which are housed a plurality of rollers 9 in a full type roller form.

In the roller housing space 8 around the rollers 9, predetermined clearances are provided in radial and circumferential directions.

Figure 4:
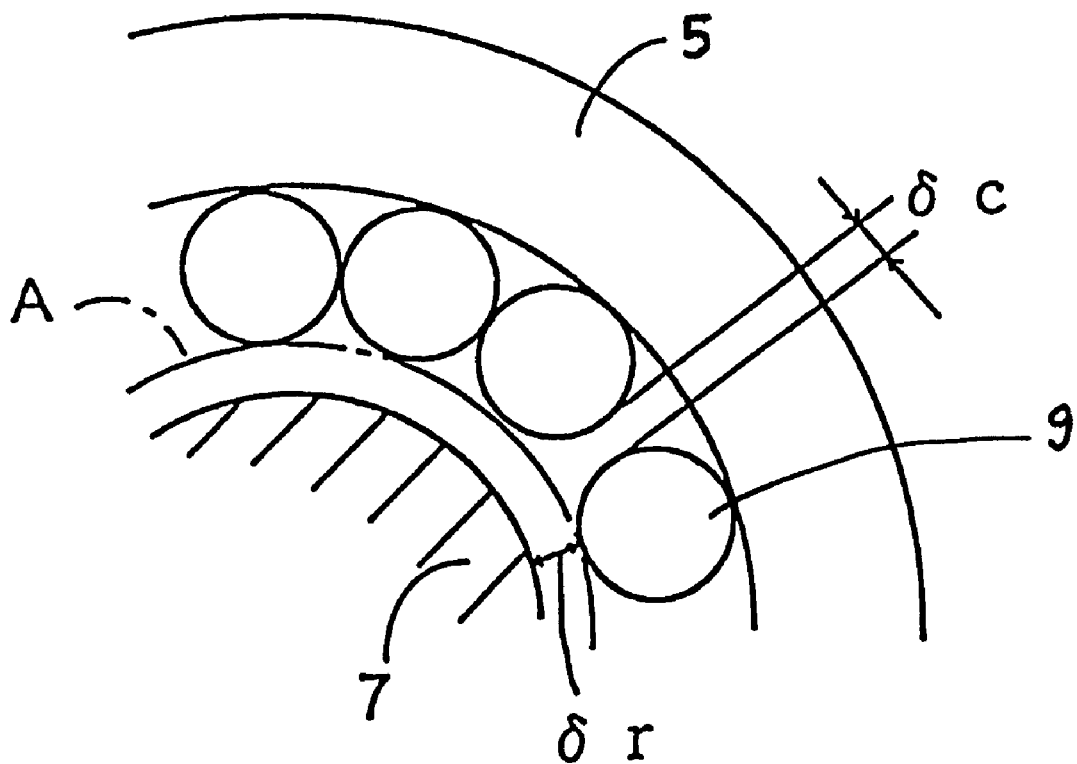
FIG. 4 is a schematic view showing a clearance in a circumferential direction and a clearance in a radial direction.

As shown in FIG. 4, the clearance in the radial direction refers to a difference δ r between the inscribed circle A of the rollers 9 and the outer periphery of the pin 7 with the rollers 9 in contact with the inner peripheral surface of the ring 5. The load rate of the rollers varies with the size of the clearance in the radial direction.

As the clearance δ r in the radial direction increases, the load rate decreases, so that the surface pressure per roller 9 increases. On the other hand, as the clearance δ r decreases, the load rate increases, so that even though the surface pressure per roller 9 decreases, due to the influence of the shape of the inner peripheral surface of the ring 5 (roundness and cylindricity), the clearance can become partially negative. This can cause seizure.

Also, as shown in FIG. 4, the clearance in a circumferential direction refers to a clearance per roller which is determined by dividing by the total number of the rollers 9 the clearance δ c formed between the first and last rollers when all the rollers 9 have been displaced together into contact with one another and with the rollers 9 abutting the inner peripheral surface of the ring 5.

As the clearance in the circumferential direction increases, skew of the rollers 9 increases, so that an excessive load due to an edge load is produced. On the other hand, as the clearance in the circumferential direction decreases, there occurs a problem of wear due to a struggle between the rollers 9 and heat buildup due to slip.

The clearances were heretofore set experientially at 0.009–0.022 mm in the radial direction and 0.003–0.011 mm in the circumferential direction in view of ease of assembly of the rollers. But according to this invention, the clearance in the radial direction has been changed from the conventional 0.009–0.022 mm to 0.005–0.018 mm to extend the life of the rocker arm in view of the relation between the clearance in the circumferential direction in this range and the life of the rocker arm.

That is to say, we have found that it is possible to extend the life when the clearance in the radial direction is changed to 0.005–0.018 mm, and the clearance in the circumferential direction is set at 0.012–0.018 mm, which is larger than the conventional range of 0.003–0.011 mm.

Also, it is possible to extend the life by setting the clearance in the circumferential direction at the upper limit of the clearance in the radial direction of the rollers mounted in the roller housing space.

Also, by setting the relation between the clearance in the radial direction and the diameter of the rollers 9 such that the value obtained by dividing the clearance in the circumferential direction by the diameter of the rollers 9 will be 0.005–0.010 and the value obtained by dividing the clearance in the radial direction by the diameter of the rollers 9 will be 0.001–0.010, it is possible to prolong the life.

Figure 5:
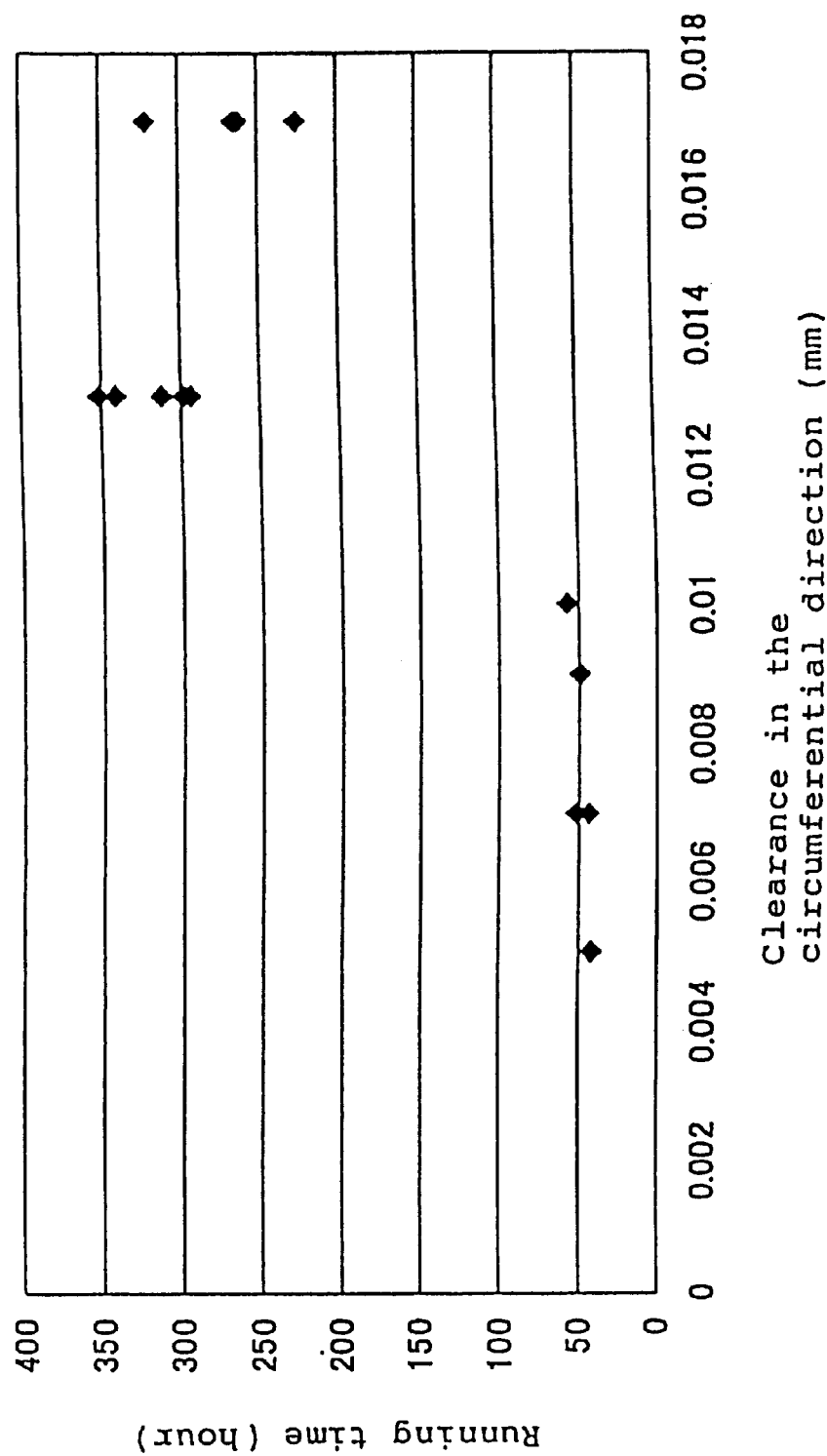
FIG. 5 is a graph showing the relation between the the clearance in the circumferential direction and the working life of the rocker arm.

The results of tests in which the relation between the clearances in the radial and circumferential directions for achieving a long life were verified experimentally are shown in Table 1 and FIG. 5. Specifications of the ring 5, pin 7 and rollers 9 are as follows. The experiment conditions were as follows: number of revolutions N:7000 r/min., radial load Fr 2950 N and evaluated life Lh:44.1 hr.

For the ring 5, one made of steel (SUJ2) and subjected to heat treatment (quenching) was used. The surface hardness of the ring 5 was 60–64 $H_RC$ (Rockwell hardness). Also, the roughness of the inner peripheral surface of the ring 5 was Ra 0.25. Its outer peripheral surface was subjected to surface-roughening treatment for increasing the ability to retain an oil film of lubricating oil.

In the surface-roughening treatment, independent minute recesses are preferably formed innumerably such that when the surface roughness of the outer peripheral surface of the ring 5 is indicated in terms of parameter RMS in the axial and circumferential directions, the ratio RMS (L)/RMS (C) between the surface roughness in the axial direction RMS (L) and the surface roughness in the circumferential direction RMS (C) is 1.0 or under, and the surface roughness parameter SK value is negative both in the axial and circumferential directions.

The parameter SK value indicates skewness of the distribution curve of the surface roughness. If the distribution is symmetrical as in the Gaussian distribution, the SK value will be zero. By setting the parameter SK value at −1.6 or under both in the circumferential and axial directions, oil film can be formed advantageously. Such a rough surface can be obtained by barrel grinding.

For the pin 7, one made of steel (SUJ2) and having its outer peripheral surface hardened to a Vickers hardness of 700–830 Hv by high-frequency heat treatment was used. The depth of the effective hardened layer was B: 1.5 mm or more at the axial central portion of the pin 7, and C: 1.0–2.0 mm at its press-in portions. Also, C: the surface hardness of the pin 7 was 650 Hv or over, and was 200–350 Hv at D: the caulked portion of the pin 7. The surface roughness of the pin 7 was Ra 0.20.

For the rollers 9, ones made of steel (SUJ2) and subjected to heat treatment (quenching) were used. The surface hardness of the rollers 9 was $H_RC$ 60–64. Also, the surface roughness of the rollers was Ra 0.05. The crowning drop amount in manufacturing the rollers 9 was 1–15 μm. The outer periphery of the rollers 9 at both ends thereof was cut-crowned. The cut-crowning has preferably a radius of 700 mm.

According to this invention, it is possible to prolong the life of the rocker arm not by improving the material but by suitably controlling the relation between clearances in circumferential and radial directions in a roller housing space provided between the outer peripheral surface of the pin and the inner peripheral surface of the ring.

TABLE 1

| | Clearance in the circumferential direction (mm) | Clearance in the radial direction (mm) | Running time (hour) |
|---|---|---|---|
| Conventional example | 0.005 | 0.005~ | 41.6 |
| | 0.007 | 0.018 | 51.4 |
| | 0.010 | | 57.1 |
| | 0.009 | | 49 |
| | 0.007 | | 43.5 |
| Example | 0.013 | 0.005~ | 312.1 |
| | 0.013 | 0.018 | 341.2 |
| | 0.013 | | 298.1 |
| | 0.013 | | 294.1 |
| | 0.013 | | 351.4 |
| Example | 0.017 | 0.005~ | 225.8 |
| | 0.017 | 0.018 | 262.8 |
| | 0.017 | | 265.7 |
| | 0.017 | | 264.5 |
| | 0.017 | | 321 |

What is claimed is:

1. A rocker arm comprising a rocker arm body, a ring rotatably supported on one end of said rocker arm body by a pin, a roller housing space formed between an outer peripheral surface of said pin and an inner peripheral surface of said ring, and a plurality of second rollers mounted in said roller housing space in a full type form, wherein a clearance in a circumferential direction provided between said rollers in said roller housing space is predetermined relative to a clearance in a radial direction, wherein the clearance per roller in the circumferential direction is 0.012–0.018 mm.

2. The rocker arm as claimed in claim 1 wherein the clearance per roller in the circumferential direction divided by the diameter of said each roller is 0.005–0.010.

3. The rocker arm as claimed in claim 1 wherein the clearance in the radial direction by the diameter of said each roller is 0.001–0.010 mm.

4. The rocker arm as claimed in claim 1 wherein the outer periphery of each of said rollers is cut-crowned.

5. The rocker arm as claimed in claim 1 wherein each of said rollers has a surface roughness Ra of 0.05.

6. The rocker arm as claimed in claim 1 wherein the inner peripheral surface of said ring forming said roller housing space has a surface roughness Ra of 0.25.

7. The rocker arm as claimed in claim 1 wherein the outer peripheral surface of said pin forming said roller housing space has a surface roughness Ra of 0.20.

8. The rocker arm as claimed in claim 1 wherein independent, minute recesses are formed innumerably on outer periphery of said ring such that when the surface roughness of the outer peripheral surface of said ring is indicated in parameter RMS, the ratio RMS (L)/RMS (C) between the surface roughness in the axial direction RMS (L) and the surface roughness in the circumferential direction RMS (C) will be 1.0 or under, and another surface roughness parameter SK value will be negative both in the axial and circumferential directions.

9. A rocker arm comprising a rocker arm body, a ring rotatably supported on one end of said rocker arm body by a pin, a roller housing space formed between an outer peripheral surface of said pin and an inner peripheral surface of said ring, and a plurality of second rollers mounted in said roller housing space in a full type form, wherein a clearance in a circumferential direction provided between said rollers in said roller housing space is predetermined relative to a clearance in a radial direction, wherein the clearance in the radial direction is 0.005–0.018 mm.

10. The rocker arm as claimed in claim 9 wherein the clearance per roller in the circumferential direction divided by the diameter of said each roller is 0.005–0.010.

11. The rocker arm as claimed in claim 9 wherein the clearance in the radial direction divided by the diameter of said each roller is 0.001–0.010 mm.

12. The rocker arm as claimed in claim 9 wherein the outer periphery of each of said rollers is cut-crowned.

13. The rocker arm as claimed in claim 9 wherein each of said rollers has a surface roughness Ra of 0.05.

14. The rocker arm as claimed in claim 9 wherein the inner peripheral surface of said ring forming said roller housing space has a surface roughness Ra of 0.25.

15. The rocker arm as claimed in claim 9 wherein the outer peripheral surface of said pin forming said roller housing space has a surface roughness Ra of 0.20.

16. The rocker arm as claimed in claim 9 wherein independent, minute recesses are formed innumerably on outer periphery of said ring such that when the surface roughness of the outer peripheral surface of said ring is indicated in parameter RMS, the ratio RMS (L)/RMS (C) between the surface roughness in the axial direction RMS (L) and the surface roughness in the circumferential direction RMS (C) will be 1.0 or under, and another surface roughness parameter SK value will be negative both in the axial and circumferential directions.

* * * * *